United States Patent
Gregorski (10) Patent No.: US 10,071,497 B2
(45) Date of Patent: *Sep. 11, 2018

(54) COMPRESSIVE WEDGE CLEAVING OF OPTICAL FIBERS

(71) Applicant: Corning Optical Communications LLC, Hickory, NC (US)

(72) Inventor: Steven Joseph Gregorski, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/597,432

(22) Filed: May 17, 2017

(65) Prior Publication Data

US 2017/0246756 A1   Aug. 31, 2017

Related U.S. Application Data

(63) Continuation of application No. PCT/US2015/046209, filed on Aug. 21, 2015, which is a continuation of application No. 14/557,719, filed on Dec. 2, 2014, now Pat. No. 9,144,917.

(60) Provisional application No. 62/084,791, filed on Nov. 26, 2014.

(51) Int. Cl.
*G02B 6/00* (2006.01)
*B26F 3/00* (2006.01)
*G02B 6/25* (2006.01)

(52) U.S. Cl.
CPC ............ *B26F 3/00* (2013.01); *G02B 6/00* (2013.01); *G02B 6/25* (2013.01)

(58) Field of Classification Search
CPC ............ B26F 3/00; G02B 6/25; G02B 6/00
See application file for complete search history.

(56) References Cited

U.S. PATENT DOCUMENTS

| | | |
|---|---|---|
| 4,413,763 A | 11/1983 | Lukas |
| 6,731,849 B1 | 5/2004 | Singh et al. |
| 8,132,971 B2 | 3/2012 | Luther et al. |
| 9,144,917 B1 | 9/2015 | Gregorski |
| 2013/0028561 A1* | 1/2013 | Luther ............... G02B 6/3834 385/80 |
| 2014/0299645 A1 | 10/2014 | Lurie et al. |
| 2015/0099984 A1* | 4/2015 | Kankaria ............ A61B 5/0066 600/478 |

OTHER PUBLICATIONS

Patent Cooperation Treaty, International Search Report and Written Opinion for PCT/US2015/046209, dated Oct. 28, 2015, 3 pages.

* cited by examiner

*Primary Examiner* — Ellen Kim
(74) *Attorney, Agent, or Firm* — Adam R. Weeks (57) ABSTRACT

Lengths of an optical fiber may be broken apart from one another while a cross-sectional region of the optical fiber is in a state of multi-axial compressive stress, and the multi-axial compressive stress extends across the optical fiber. The breaking can include propagating a crack across the optical fiber. The crack can be positioned in sufficiently close proximity to the cross-sectional region so that the multi-axial compressive stress restricts the crack from penetrating the cross-sectional region. At least a portion of the optical fiber may be in tension during the breaking.

23 Claims, 4 Drawing Sheets

COMPRESSIVE WEDGE CLEAVING OF OPTICAL FIBERS

PRIORITY APPLICATIONS

This application is a continuation of PCT/US2015/046209, filed on Aug. 21, 2015, which claims the benefit of priority of U.S. application Ser. No. 14/557,719, filed on Dec. 2, 2014, and U.S. Provisional Application Ser. No. 62/084,791, filed on Nov. 26, 2014.

BACKGROUND

This disclosure generally relates to optical fibers and, more particularly, to methods and systems for cleaving optical fibers.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or in the field (e.g., using a "field-installable" fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another fiber optic connector or adapter, an optical fiber in the ferrule is positioned in a known, fixed location relative to the housing. This allows an optical communication to be established when the optical fiber is aligned with another optical fiber provided in the mating component (the other fiber optic connector or adapter).

The bores of the ferrule in a fiber optic connector extend to a front of the ferrule. With such a design, an optical fiber can be inserted into and passed through the ferrule. Either before of after securing the optical fiber relative to the ferrule (e.g., by using a bonding agent in the bore), an optical surface may be formed on the optical fiber. One conventional method of forming an optical surface involves a mechanical cleaving step followed by several mechanical polishing steps. Such methods can be time-consuming and labor-intensive, for example due to the number of polishing steps that may be required to form an optical surface that is both of high quality and in close proximity to the front of the ferrule. Another conventional method of forming an optical surface involves laser cleaving. However, suitable lasers may be relatively expensive, and laser cleaving typically requires polishing. Accordingly, there remains room for improvement.

SUMMARY

One aspect of this disclosure is the provision of a precision process that is for breaking optical fibers and may be used in place of traditional cleaving processes, wherein the newly provided process can be relatively low cost, and may also be readily used in the field.

According to one embodiment of this disclosure, a method for at least separating lengths of an optical fiber from one another comprises propagating at least one crack across the optical fiber at a position between the lengths of the optical fiber. The propagating occurs while a cross-sectional region of the optical fiber is in a state of multi-axial compressive stress, and the multi-axial compressive stress of the cross-sectional region extends across the optical fiber. The at least one crack is positioned in sufficiently close proximity to the cross-sectional region while the cross-sectional region is in the state of multi-axial compressive stress so that the multi-axial compressive stress in the cross-sectional region restricts the at least one crack from penetrating the cross-sectional region.

In accordance with another embodiment, a method for at least separating lengths of an optical fiber from one another comprises causing compressive radial stress substantially throughout a cross-sectional region of the optical fiber. The cross-sectional region extends crosswise to a lengthwise axis of the optical fiber, and the cross-sectional region includes an annular portion of an outermost surface of the optical fiber. The method also comprises causing tension in at least a portion of the optical fiber, and propagating at least one crack across the optical fiber at a position between the lengths. The at least one crack is positioned in sufficiently close proximity to the cross-sectional region, so that the compressive radial stress that is present substantially throughout the cross-sectional region restricts the at least one crack from penetrating the cross-sectional region, and the propagating occurs while both: a) the compressive radial stress is present substantially throughout the cross-sectional region; and b) the tension is present in the at least the portion of the optical fiber.

Additional features and advantages will be set forth in the detailed description which follows, and in part will be readily apparent to those skilled in the technical field of optical communications. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiments, and together with the description serve to explain principles and operation of the various embodiments. Features and attributes associated with any of the embodiments shown or described may be applied to other embodiments shown, described, or appreciated based on this disclosure.

DETAILED DESCRIPTION

Various embodiments will be further clarified by examples in the description below. In general, the description relates to methods of breaking optical fibers that may be used in place of at least some prior cleaving processes. The methods may be part of a cable assembly process for a fiber optic cable. That is, the methods may be part of terminating optical fibers from a fiber optic cable with a fiber optic connector to form a cable assembly.

Figure 1:
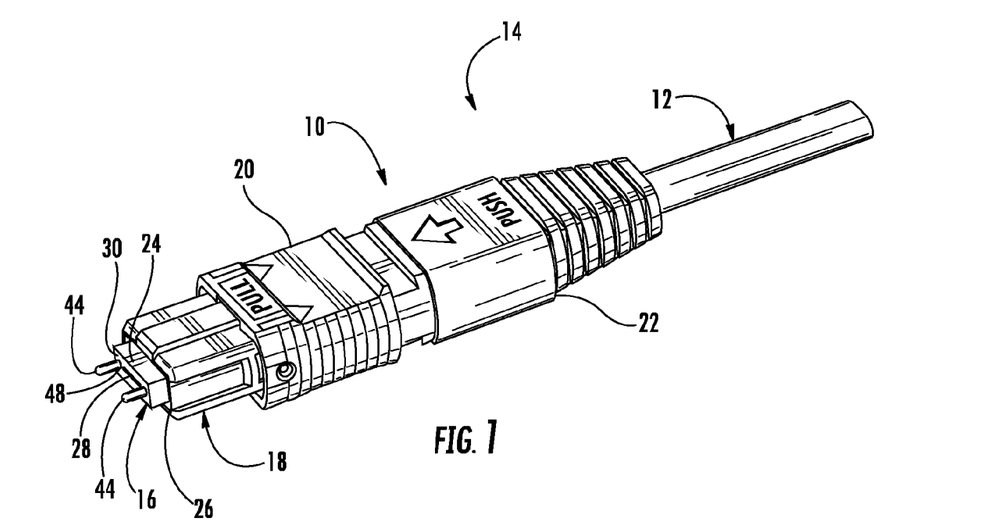
FIG. 1 is a perspective view of an example of a fiber optic cable assembly that includes a fiber optic connector.
Figure 2:
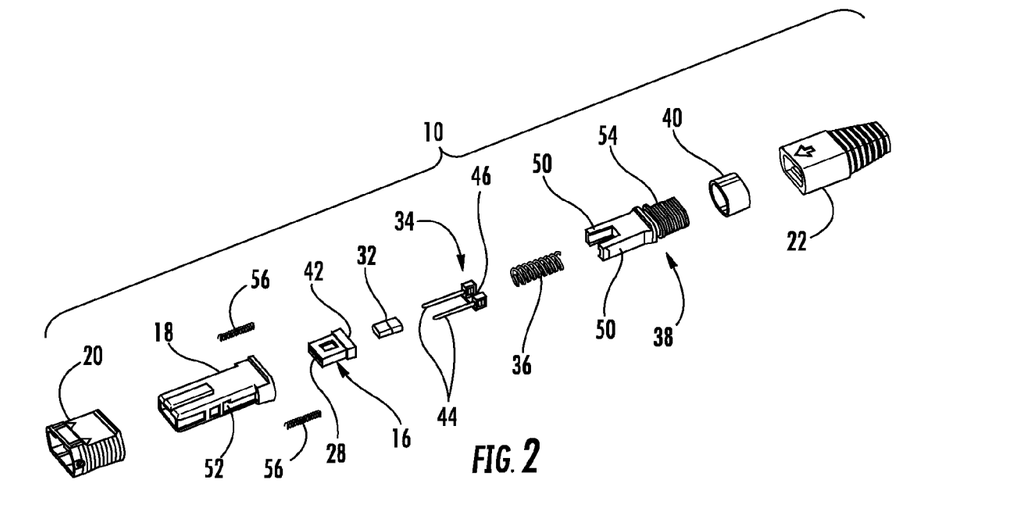
FIG. 2 is an exploded perspective view of the connector of FIG. 1.

One example of a fiber optic connector ("connector") 10 for such a cable assembly is shown in FIGS. 1 and 2, and this type of connector may be referred to as a multi-fiber push on (MPO) connector, which includes a push-pull latch, and incorporates a mechanical transfer (MT) ferrule. These connectors can achieve a very high density of optical fibers, which reduces the amount of hardware, space, and effort to establish a large number of interconnects. A general discussion of the connector 10 will be provided, followed by a discussion of an example of a method for precisely breaking optical fibers. Although the connector 10 is shown in the form of a MPO-type connector, the methods described below may be applicable to processes involving different fiber optic connector designs, such as SC, ST, LC, and other single fiber or multifiber connector designs, and different types of fiber optic cable assemblies.

As shown in FIG. 1, the connector 10 may be installed on a fiber optic cable ("cable") 12 to form a fiber optic cable assembly 14. The connector 10 includes a ferrule 16, a housing 18 received over the ferrule, a slider 20 received over the housing, and a boot 22 received over the cable 12. The ferrule 16 is spring-biased within the housing 18 so that a front portion 24 of the ferrule extends beyond a front end 26 of the housing. Optical fibers ("fibers") carried by the cable 12 extend through respective bores 28 in the ferrule 16 before terminating at or near a front end face 30 of the ferrule. There may be a single row of twelve bores 28, although it is within the scope of this disclosure for there to be a greater or lesser number of each of the rows and bores. The fibers are secured within the ferrule 16 using an adhesive material (e.g., epoxy) and can be presented for optical coupling with fibers of a mating component (e.g., another fiber optic connector, not shown) when the housing 20 is inserted into an adapter, receptacle, or the like.

As shown in FIG. 2, the connector 10 further includes a ferrule boot 32, guide pin assembly 34, spring 36, retention body ("crimp body") 38, and crimp ring 40. The ferrule boot 32 is received in a rear portion 42 of the ferrule 16 to help support the fibers extending to the bores 28. The guide pin assembly 34 includes a pair of guide pins 44 extending from a pin keeper 46. Features on the pin keeper 46 cooperate with features on the guide pins 44 to retain portions of the guide pins 44 within the pin keeper 46. When the connector 10 is assembled, the pin keeper 46 is positioned against a back surface of the ferrule 16, and the guide pins 44 extend through pin holes 48 (FIG. 1) provided in the ferrule 16 so as to project beyond the front end face 30. The presence of the guide pins 44 means that the connector 10 is in a male configuration. In a female configuration the guide pins 44 are not present. As another example, the guide pin assembly 34 may be omitted, such as when other provisions may be made for alignment, as may be the case when the ferrule 16 includes molded-in post and hole alignment features.

Both the ferrule 16 and guide pin assembly 34 (if present) are biased to a forward position relative to the housing 18 by the spring 36. More specifically, the spring 36 is positioned between the pin keeper 46 and a portion of the crimp body 38. The crimp body 38 is inserted into the housing 18 when the connector 10 is assembled. The crimp body 38 includes latching arms 50 that engage recesses 52 in the housing 18. The spring 36 is compressed by this point and exerts a biasing force on the ferrule 16, such as via the pin keeper 46. The rear portion 42 of the ferrule 16 defines a flange that interacts with a shoulder or stop formed within the housing 18 to retain the rear portion 42 within the housing 18.

In a manner not shown in the figures, aramid yarn or other strength members from the cable 12 are positioned over a rear end portion 54 of the crimp body 38 that projects rearwardly from the housing 18. The aramid yarn is secured to the end portion 54 by the crimp ring 40, which is slid over the end portion 54 and deformed after positioning the aramid yarn. The boot 22 covers this region, as shown in FIG. 1, and provides strain relief for the fibers by limiting the extent to which the connector 10 can bend relative to the cable 12.

Variations of these aspects will be appreciated by persons skilled in the design of fiber optic cable assemblies. Again, the embodiment shown in FIGS. 1 and 2 is merely an example of a fiber optic connector that may be used in the methods described below. The general overview has been provided simply to facilitate discussion.

Figure 3:
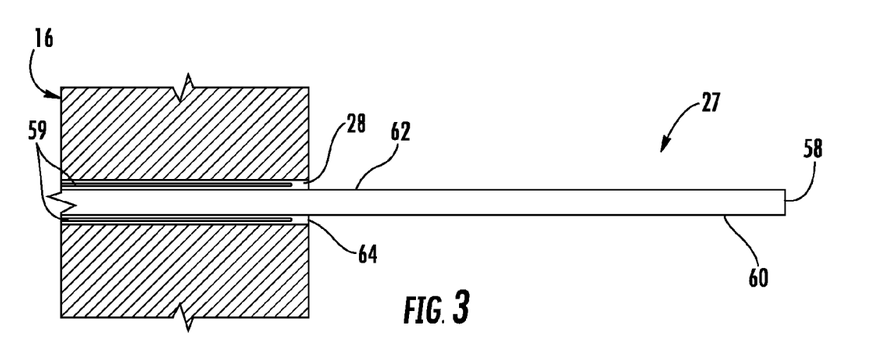
FIG. 3 is an enlarged, schematic, partially cross-sectional side view of a representative portion of a ferrule of the connector of FIG. 1 having a representative optical fiber of the cable of FIG. 1 extending therethrough, in accordance with an exemplary embodiment of this disclosure.

With this in mind, the one or more fibers of the cable 12 may be mounted to the ferrule 16 prior to the connector 10 being completely assembled, and a method of mounting and breaking the fibers is described in the following, in accordance with an embodiment of this disclosure. As schematically shown in FIG. 3, a bare (e.g., "stripped") portion of a representative fiber 27 extends through a representative bore 28 of the ferrule 16, and an adhesive material, such as epoxy 59, may be within the bore 28 for use in fixedly connecting the fiber in the bore, as will be discussed in greater detail below. The fiber 27 may be inserted through the bore 28 so that the ferule 16 is positioned between the cable 12 (FIG. 1) and a terminal end 58 of the fiber. More specifically, the terminal end 58 of the fiber 27 may be inserted through the bore 28 so that a first length 60 of the fiber is passed through the bore and a second length 62 of the fiber extends outwardly from an opening 64 of the bore. At this stage in the process, any boundaries between the first and second lengths 60, 62 of the fiber 27 can be indiscernible. Nonetheless, the first and second lengths 60, 62 are introduced at this time as a prelude to the more detailed discussions about them in the following.

While the second length 62 of the fiber 27 extends outwardly from the opening 64 of the bore 28 as shown in FIG. 3, a bulge 66 (FIG. 4) may be formed in the fiber at the transition between the first and second lengths 60, 62 of the fiber. The bulge 66 is formed at a distance from the ferrule 16, so that the bulge is spaced apart from the ferrule. The bulge 66 may be formed by localized heating of the fiber 27. The localized heating for forming the bulge 66 may be carried out through the use of any suitable heat source such as, for example, a flame, laser beam or electrical arcs.

Figure 4:
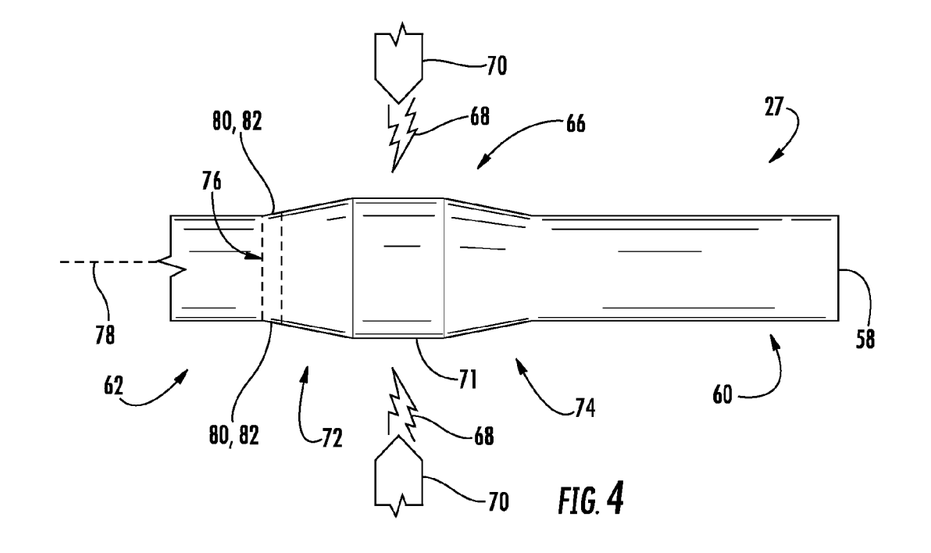
FIG. 4 is enlarged, schematic side view of a bulge formed in a portion of the optical fiber of FIG. 3, and associated electrodes and arcs for forming the bulge are also schematically shown, in accordance with the exemplary embodiment.

In the example schematically shown in FIG. 4, the localized heating for forming the bulge 66 may be provided by one or more high-temperature fusion arc(s) 68 provided between opposing electrodes 70. The energy from the heat source, such as the arc(s) 68, acts to locally soften the fiber 27 to form a locally deformed region that may be referred to as the bulge 66. It is believed that surface tension effects caused by the localized heating cause an increase in the fiber diameter, thereby creating the bulge 66. The bulge 66 has a diameter that is larger than the normal diameter of the fiber 27.

As schematically shown in FIG. 4, the bulge 66 may have a substantially cylindrical portion 71 positioned between and contiguous with a pair of substantially frusto-conical portions 72, 74, or the like. The frusto-conical portion 72 may be referred to as, for example, a wedge or wedged zone, or the like, for reasons that will become further apparent in the following. As schematically illustrated by a pair of parallel dashed lines in FIG. 4, the second length 62, or more specifically the inner frusto-conical portion 72, may be characterized as including a three-dimensional (e.g., thick) cross-sectional region 76 that extends both along and cross-wise to a lengthwise axis 78 of the fiber 27. In FIG. 4, the pair of parallel dashed lines illustrate the opposite ends of the cross-sectional region 76. The cross-sectional region 76 may be configured so that it extends substantially perpendicularly to the lengthwise axis 78. The bulge 66 may be formed in a manner so as not to substantially affect the wave-guiding properties of the second length 62 of the fiber 27, wherein the second length of the fiber includes the cross-sectional region 76.

The cross-sectional region 76 of the embodiment shown includes an inclined, substantially frusto-conical, outermost engagement surface 80 that extends around and along the lengthwise axis 78 of the fiber 27. The engagement surface 80 is inclined relative to the lengthwise axis 78. Accordingly and as best understood with reference to FIG. 4, the engagement surface 80 may be characterized as including opposite inclines 82 in a side elevation view. The inclines 82, which are parts of the substantially frusto-conical engagement surface 80, extend along and are inclined relative to the lengthwise axis 78. In accordance with an embodiment, FIG. 4 can be schematically illustrative of each of right and left side elevation views, and top and bottom plan views of the bulge 66. FIG. 4 is schematic because, for example, at least some of the surfaces of the bulge 66 are typically not perfectly cylindrical or perfectly frusto-conical, as discussed in greater detail below. Indeed, the surfaces of the bulge 66 may be somewhat rounded in the direction along the lengthwise axis 78.

Figure 5:
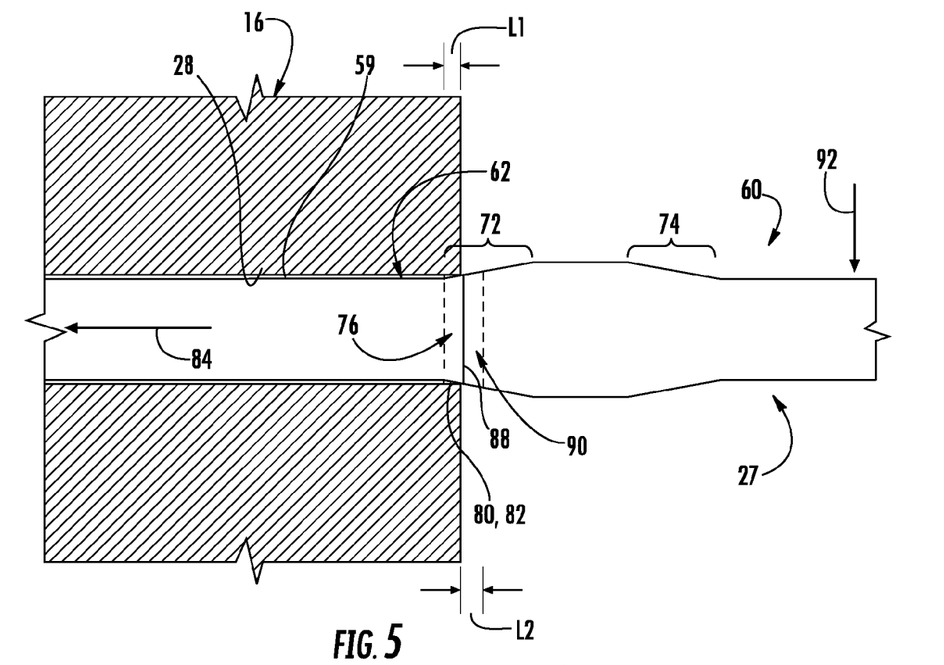
FIG. 5 is an enlarged, schematic, partially cross-sectional side view similar to FIG. 3, except for showing the bulge wedged into a bore of the ferrule, in accordance with the exemplary embodiment.

In the embodiment illustrated in the drawings, the bulge 66 is formed in a manner so that the cross-sectional region 76 has a maximum outer diameter that is only slightly larger than the diameter of the bore 28 (FIG. 3). Referring to FIG. 5, the cross-sectional region 76 with its engagement surface 80 may be characterized as being a fiber-to-ferrule interface region that is for being in opposing face-to-face contact or engagement with the ferrule 16. More specifically, after the bulge 66 is formed at a distance from the ferrule 16, a method of this disclosure includes causing relative movement between the fiber 27 and the ferrule, so that the cross-sectional region 76 of the second length 62 is wedged at least partially into the bore 28 of the ferrule. This relative movement between the fiber 27 and the ferrule 16 may be provided, for example, through manual action or any other suitable action. The manual or other suitable action may include pulling the cable 12 (FIG. 1) or fiber 27 so that the cross-sectional region 76 moves toward the opening 64 (FIG. 3) of the bore 28, and the engagement surface 80, including the inclines 82, engages into opposing face-to-face contact with the ferrule 16. The pulling of the cable 12 or fiber 27, and the associated tension in the second length 62 of the fiber, is schematically illustrated by an arrow 84 in FIG. 5.

Partially reiterating from above, the maximum outer diameter of the cross-sectional region 76 may initially be only slightly larger than the diameter of the bore 28. At the point of engagement between the wedged cross-sectional region 76 and the surface of the bore 28, the amount of diameter increase for the bore may be about 0.5% for single mode ferrules, and about 2% to about 4% for multimode ferrules.

The engagement surface 80 of the cross-sectional region 76 engaging into opposing face-to-face contact with the ferrule 16 may comprise, consist essentially of, or consist of the engagement surface of the cross-sectional region engaging into opposing face-to-face contact with the surface of the bore 28 proximate the opening 64 (FIG. 3) of the bore. The surface of the bore 28 can be the cylindrical surface of the ferrule 16 that defines the bore. More specifically, the opposing face-to-face contact may be defined at least between a substantially circular portion of the engagement surface 80 and a substantially circular portion of the surface of the bore 28. Even though a large portion of the central region of the bulge 66 may be distorted rather than being perfectly cylindrical or perfectly frusto-conical, there is a transition length between the central region of the bulge 66 and the non-bulged portion of the fiber 27, and the cross-sectional region 76, including the substantially circular portion of the engagement surface 80, is typically located in this transition length. Since the diameter of the non-bulged portion of the fiber 27 is typically only slightly smaller than the diameter of the bore 28 (typically less than 0.5 um clearance on the radius), when the inner frusto-conical portion 72 is pulled back into the bore, only a small part of the inner frusto-conical portion extends into the bore before the contact between the engagement surface 80 and the surface of the bore arrests the relative movement between the fiber 27 and the ferrule 16.

As additional examples, the relative movement between the fiber 27 and ferrule 16 may cause and/or include, for example, the inner frusto-conical portion 72 at least partially entering the bore 28, at least one of the inclines 82 engaging the bore, relative sliding between the incline and the bore, forming an interference fit between the cross-sectional region and the surface of bore, and placing at least a portion of the cross-sectional region 76 in a state of multi-axial compressive stress. The multi-axial compressive stress in the wedged cross-sectional region 76 may be more specifically in the form of biaxial compressive stress, as will be discussed in greater detail below.

The ferrule 16 and, thus, the surface of the bore 28, may be made of a relatively rigid and hard ceramic material, or any other suitable material. In this regard and further regarding the illustrated embodiment's wedged engagement between the engagement surface 80 of the cross-sectional region 76 and the bore 28, the multi-axial compressive stress in the wedged cross-sectional region is caused by the surface of the bore applying contact pressure against the engagement surface of the wedged cross-sectional region. The surface of the bore 28 applying the radial contact pressure against the engagement surface 80 of the wedged cross-sectional region 76 may include: applying radial contact pressure against at least part of the engagement surface 80; and/or applying radial contact pressure against substantially all of a substantially circular portion of the engagement surface 80.

Figure 6:
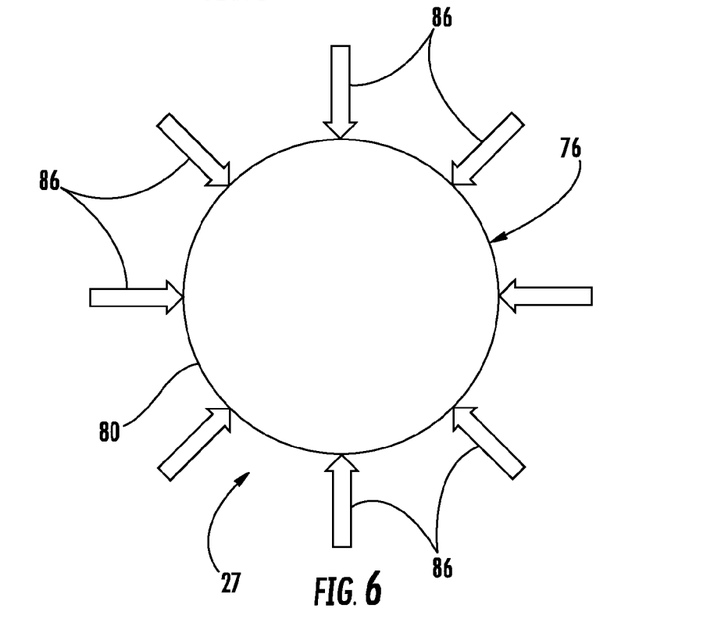
FIG. 6 is a schematic, isolated, end elevation view of a cross-sectional region of a wedged zone of the bulge of FIG. 5 being exposed to inwardly-directed radial force components, in accordance with the exemplary embodiment.

For the embodiment illustrated in the drawings, due to the substantially frusto-conical, outermost engagement surface 80 being inclined relative to the lengthwise axis 78 of the fiber 27, each contact force applied by the surface of the bore 28 against the engagement surface 80 can be resolved or otherwise be theoretically divided into a pair of independent vectors or force components that extend at right angles to each other. One of the components of the pair of force components is an axial force component that extends substantially parallel to the lengthwise axis 78. In contrast, the other force component of the pair of force components is a radial force component that extends toward and substantially perpendicular to the lengthwise axis 78. For example, FIG. 6 schematically illustrates, with radially inwardly pointing arrows 86, a representative series or sampling of the inwardly-directed radial force components that are applied against the engagement surface 80 of the wedged cross-sectional region 76 by the surface of the bore 28. In the embodiment illustrated in the drawings, it is the radial force components 86 of the contact force applied by the surface of the bore 28 against the engagement surface 80 that cause the compressive stress in the wedged cross-sectional region 76 to be biaxial compressive stress.

In the embodiment with the biaxial compressive stress, for the direction of (i.e., along) the lengthwise axis 78, there is substantially zero compressive stress in the wedged cross-sectional region 76. Therefore, the biaxial compressive stress can be quantified through the use of a two-dimensional domain having two coordinate axes, wherein the two coordinate axes are both perpendicular to the lengthwise axis 78, and the two coordinate axes are perpendicular to one another. In this example, since the compressive stress in the wedged cross-sectional region 76 can be quantified solely through the use of a two-dimensional domain having two coordinate axes, the compressive stress in the wedged cross-sectional area is biaxial compressive stress.

Further regarding the cross-sectional 76 area being in a state of multi-axial compressive stress, the multi-axial compressive stress may extend substantially throughout the wedged cross-sectional region. In addition, the multi-axial compressive stress may comprise, consist essentially of, or consist of compressive radial stress, wherein the compressive radial stress may extend substantially throughout the wedged cross-sectional region 76. As another example, multi-axial compressive stress may comprise, consist essentially of, or consist of biaxial compressive stress, wherein the biaxial compressive stress may extend substantially throughout the wedged cross-sectional region 76.

For the wedged cross-sectional region 76, it is believed that there may typically be some compressive stress in the direction of (i.e., along) the lengthwise axis 78. Therefore, the multi-axial compressive stress in the wedged cross-sectional region 76 can include compressive stress in the direction of the lengthwise axis 78. Nonetheless, for the embodiment shown in the drawings, it is believed that the magnitude of any such compressive stress in the direction of the lengthwise axis 78 would be insignificant as compared to the radial compressive stress, such that the multi-axial compressive stress in the wedged cross-sectional region 76 may consist essentially of biaxial compressive stress.

As will be discussed in greater detail below, one aspect of this disclosure is the provision of a method of forming a break between the first and second lengths 60, 62 of the fiber 27, wherein the method may include breaking the first and second lengths apart from one another while the wedged cross-sectional region 76 is in a state of sufficient multi-axial compressive stress. In the embodiment illustrated in the drawings, the magnitude of the multi-axial compressive stress in the wedged cross-sectional region 76 is a function of, for example, both the inclination of the engagement surface 80 and the tension in the second length 62 of the fiber 27, wherein this tension is schematically illustrated by the arrow 84 in FIG. 5. In one embodiment, the fiber 27 is pulled back into the bore 28 under a predetermined amount of tension. For example, the amount of tension 84 in the second length 62 of the fiber 27, while the engagement surface 80 is engaged against the surface of the bore 28, may be in a range of from about 50 grams to about 500 grams, or in a range of from about 10 grams to about 100 grams.

After the cross-sectional region 76 is wedge into the bore 28, the tension 84 may be maintained while the second length 62 of the fiber 27 is bonded to the surface of the bore 28. This bonding may be carried out, for example, by applying heat to the ferrule 16, so that the heat activates the heat-activated epoxy 59, or the like. The tension 84 may be maintained until the epoxy 59 cools. Thereafter, the cooled and rigid epoxy 59 may fixedly secure at least a portion of the second length 62 of the fiber 27 in the bore 28 so that the epoxy functions to at least temporarily maintain the tension 84.

It is believed that the above-discussed engagement between the engagement surface 80 of the wedged cross-sectional region 76 and the ferrule 16, or more specifically the surface or edge of bore 28, may cause the formation of at least one crack nucleation site in the fiber 27, so that the at least one crack nucleation site is proximate the opening 28 (FIG. 3) to the bore. The crack nucleation site may be in the form of an imperfection defined at least in the outer surface of the fiber 27. The crack nucleation site may include a nick, scrape, scratch, scuff, score, or the like, or any suitable combinations thereof. For example, the one or more crack nucleation sites may extend at least partially around, or completely around, the inner frusto-conical portion 72. In this regard, a crack nucleation site is schematically illustrated as a score line 88 in FIG. 5. In accordance with an embodiment, FIG. 5 is schematically illustrative of each of right and left side views, and top and bottom plan views; therefore, FIG. 5 may be characterized as being schematically illustrative of the score line 88 extending completely around the inner frusto-conical portion 72. Alternatively, the crack nucleation site may be less extensive, such by the score line 88, or the like, extending only partially around the inner frusto-conical portion 72. FIG. 5 is schematic because, for example, any feature (e.g., score line 88) that functions as a crack nucleation site may not be readily visible to the naked eye, or the like.

As schematically shown in FIG. 5, the score line 88 is positioned between a pair of vertical dashed lines. The pair of vertical dashed lines schematically shown in FIG. 5 are for partially demarking boundaries of the wedged cross-sectional region 76 and a breaking zone 90. In the embodiment illustrated in the drawings, the breaking zone 90 is where a break occurs in response to a force, such as a breaking force schematically represented by arrow 92 in FIG. 5, being applied to the first length 60 of the fiber 27 while the multi-axial compressive stress in the wedged cross-sectional region 76 is of sufficient magnitude, as will be discussed in greater detail below.

The left-most vertical dashed line of FIG. 5 may be referred to as an inner dashed line, and the right-most dashed line of FIG. 5 may be referred to as an outer dashed line. As shown in FIG. 5, the wedged cross-sectional region 76 is positioned to the left of the score line 88, so that the wedged cross-sectional region is positioned between the score line 88 and the inner dashed line. In contrast, the breaking zone 90 includes the score line 88. The breaking zone 90 extends from the score line 88 to the right, so that the breaking zone extends from the score line 88 to the outer dashed line of FIG. 5.

The maximum diameter of the bulge 66 may be in a range of from about 125% to about 500% of the nominal diameter of the non-bulged portions of the fiber 27. As best understood with reference to FIG. 5, the length L1 of the cross-sectional region 76 may be in a range of from about 50% to about 500% of the nominal diameter of the non-bulged portions of the fiber 27. The length L2 of the breaking zone 90 may be in a range of from about 10% to about 50% of the nominal diameter of the non-bulged portions of the fiber 27.

The tension 84 may be important for causing the multi-axial compressive stress in the wedged cross-sectional region 76 to be of sufficient magnitude for causing the break to be positioned in the breaking zone 90. The tension 84 may be at least partially maintained by the epoxy 59 as discussed above, or the breaking force 92 may be applied prior to the epoxy 59 being solidified and while the tension 84 is maintained in any other suitable manner. The breaking force 92 may be provided by touching the fiber 27 with a finger, a blunt edge of a tool, or with any other suitable device. For example, a break may be formed as described herein without requiring a laser or a traditional scribe-based cleaving system.

In accordance with an embodiment of this disclosure, a break between the first and second lengths 60, 62 of the fiber 27 may be formed in the breaking zone 90 (while there is sufficient multi-axial compressive stress in the wedged cross-sectional region 76) without requiring any traditional cleaving or scoring tools. More specifically regarding this breaking, the score line 88 in FIG. 5 may also be schematically illustrative of one or more cracks 88 that propagate across the fiber 27 in response to the breaking force 92 being applied as described above. It is believed that the above-discussed crack nucleation cite(s) (e.g. score line 88) cause one or more cracks 88 to initiate within the breaking zone 90 in close proximity to the wedged cross-sectional region 76, and that the multi-axial compressive stress in the wedged cross-sectional region 76 at least partially controls the propagation of each crack 88 across the fiber 27 by restricting the crack(s) from penetrating significantly into the wedged cross-sectional region 76, if at all.

Figure 7:
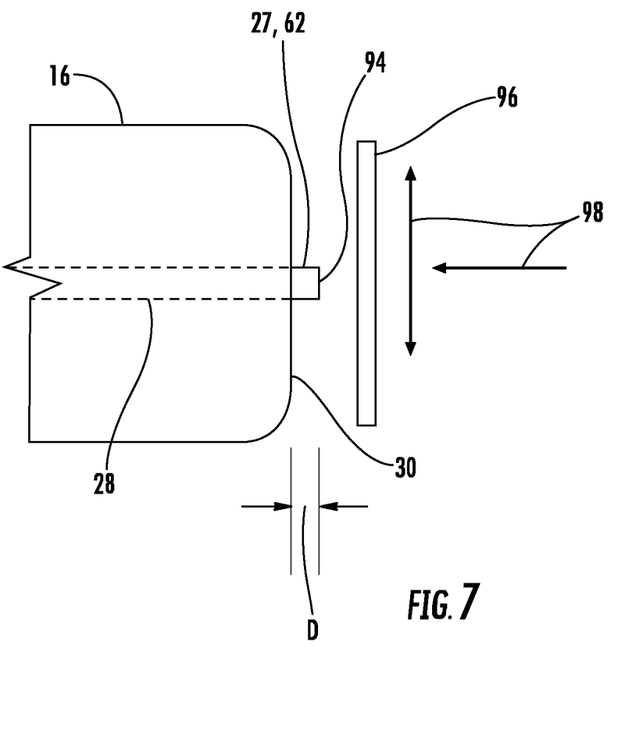
FIG. 7 is an enlarged, schematic side view of the representative portions of the ferrule and optical fiber after breaking, and a polishing pad is also schematically shown, in accordance with the exemplary embodiment.

In accordance with the embodiment shown in FIGS. 5 and 7, the crack 88 defines the boundary between the first and second lengths 60, 62. That is, the crack 88 separates the first and second lengths 60, 62 so that a newly formed fracture surface defines the resulting terminal end 94 (FIG. 7) of the second length. As shown in FIG. 7, the terminal end 94 may be positioned outside the opening 64 (FIG. 3) of the bore 28, so that a distance D is defined between the terminal end 94 and both the front end face 30 of the ferrule 16 and the opening 64 (FIG. 3) of the bore. The distance D may be about 20 um or less, or about 10 um or less, so as to be substantially proximate the opening 64 of the bore 28.

In the wedged configuration shown in FIG. 5, the inner end of the breaking zone 90 is coplanar with the front end face 30 of the ferrule 16, so that breaking zone extends outwardly from the front end face of the ferrule. The outer end of the breaking zone 90 may be described as being at the same location as the outermost portion of the terminal end 94 (FIG. 7) after breaking the lengths 60, 62 apart from one another. FIG. 7 is schematic because, for example, the terminal end 94 typically is not in the form of a flat-tipped cylindrical stub. Rather, the terminal end 94 may be in the form of a spike, with one or more tips. Therefore, the outer end of the breaking zone 90 may be described as being at the same location as the outermost tip(s) of the spike that defines the terminal end 94.

As schematically illustrated in FIG. 7, the terminal end 94 may be polished by a polishing pad 96, such as through a single-step polishing process, to reduce the distance D to about zero, to effectively cause the terminal end 94 to be substantially flush with the front end face 30 of the ferrule 16 (e.g., within about +/−200 nm, within about +/−100 nm, within a range of from about +50 nm to about −75 nm, or even within a range of about +/−30 nm in some embodiments). In FIG. 7, arrows 98 represent the polishing pad 96 being moved for facilitating the polishing.

In addition to facilitating breaking as discussed above, the cross-sectional region 76 being wedged into the bore 28 may also cause the wedged cross-sectional region to be centered in the bore 28, which may provide additional advantages.

In the above-described embodiment, the multi-axial compressive stress in the wedged cross-sectional region 76 is provided in association with inclines 82 and a ferrule 16. However, the multi-axial compressive stress in the wedged cross-sectional region 76 may be provided in any other suitable manner, such as, for example, with a precision clamping tool.

Persons skilled in optical connectivity will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is not intended that any particular order be inferred.

The above examples are in no way intended to limit the scope of the present invention. It will be understood by those skilled in the art that while the present disclosure has been discussed above with reference to examples of embodiments, various additions, modifications and changes can be made thereto without departing from the spirit and scope of the invention as set forth in the claims.

What is claimed is:

1. A method for at least separating lengths of an optical fiber from one another, comprising:

wedging a cross-sectional region of the optical fiber at least partially into a bore of a ferrule to cause the cross-sectional region to be in a state of multi-axial compressive stress, wherein the multi-axial compressive stress of the cross-sectional region extends across the optical fiber; and propagating at least one crack across the optical fiber at a position between the lengths of the optical fiber, the propagating occurring while the cross-sectional region of the optical fiber is in the state of multi-axial compressive stress, and the at least one crack being positioned in sufficiently close proximity to the cross-sectional region while the cross-sectional region is in the state of multi-axial compressive stress so that the multi-axial compressive stress in the cross-sectional region restricts the at least one crack from penetrating the cross-sectional region.

2. The method of claim 1, wherein the multi-axial compressive stress consists essentially of biaxial compressive stress extending substantially throughout the cross-sectional region.

3. The method of claim 1, wherein:
the method comprises forming a terminal end of the optical fiber;
the forming of the terminal end is comprised of the propagating; and
the method further comprises polishing the terminal end.

4. The method of claim 1, wherein:
the lengths of the optical fiber comprise a first length of the optical fiber and a second length of the optical fiber;
the cross-sectional region, which is in the state of multi-axial compressive stress, is positioned in the second length of the optical fiber; and
the propagating is comprised of:
applying a breaking force to the first length of the optical fiber at a position spaced from both the at least one crack and the second length of the optical fiber: and
the braking force extending crosswise to the first length of the optical fiber.

5. The method of claim 1, wherein:
the cross-sectional region includes an annular portion of an outermost surface of the optical fiber;
the method further comprises forming at least one incline in the annular portion of the outermost surface, so that the at least one incline is inclined relative to a lengthwise axis of the optical fiber; and
the wedging is comprised of causing relative movement between the bore and the at least one incline so that there is relative sliding between the bore and the at least one incline.

6. The method of claim 1, wherein:
the wedging is comprised of forming at least one crack nucleation site in the optical fiber, so that the at least one crack nucleation site is proximate both the outer surface of the optical fiber and an opening to the bore; and
the method further comprises initiating the at least one crack at the at least one crack nucleation site.

7. The method of claim 1, further comprising causing the multi-axial compressive stress in the cross-sectional region, wherein:
the cross-sectional region includes an annular portion of an outermost surface of the optical fiber; and
the causing of the multi-axial compressive stress is comprised of applying radial contact pressure against at least part of the annular portion of the outermost surface of the optical fiber.

8. The method of claim 7, wherein:
the multi-axial compressive stress extends substantially throughout the cross-sectional region; and
the cross-sectional region extends crosswise to a lengthwise axis of the optical fiber.

9. A method for at least separating lengths of an optical fiber from one another, comprising:
causing a cross-sectional region of the optical fiber to be in a state of multi-axial compressive stress, wherein:
the multi-axial compressive stress of the cross-sectional region extends across the optical fiber,
the cross-sectional region includes an annular portion of an outermost surface of the optical fiber,
the causing of the multi-axial compressive stress is comprised of applying radial contact pressure against at least part of the annular portion of the outermost surface of the optical fiber, and
the applying of the radial contact pressure is comprised of causing relative movement between the optical fiber and a ferrule, so that there is an engaging between the ferrule and the optical fiber, and the engaging comprises there being opposing face-to-face contact between at least:
a bore of the ferrule, and
an incline in the annular portion of the outermost surface of the optical fiber, wherein the incline is inclined relative to a lengthwise axis of the optical fiber; and
propagating at least one crack across the optical fiber at a position between the lengths of the optical fiber, the propagating occurring while the cross-sectional region of the optical fiber is in the state of multi-axial compressive stress, and
the at least one crack being positioned in sufficiently close proximity to the cross-sectional region while the cross-sectional region is in the state of multi-axial compressive stress so that the multi-axial compressive stress in the cross-sectional region restricts the at least one crack from penetrating the cross-sectional region.

10. The method of claim 9, wherein:
the method further comprises inserting the optical fiber through the bore, and forming the incline after the inserting of the optical fiber through the bore; and
the causing of the relative movement comprises causing the incline to enter the bore after the forming of the incline.

11. The method of claim 9, wherein:
the engaging comprises forming at least one crack nucleation site in the optical fiber, so that the at least one crack nucleation site is proximate both the outer surface of the optical fiber and an opening to the bore; and
the method further comprises initiating the at least one crack at the at least one crack nucleation site.

12. The method of claim 9, wherein at least a portion of the optical fiber is in tension during the propagating.

13. A method for at least separating lengths of an optical fiber from one another, comprising:
mounting the optical fiber to a ferrule to cause compressive radial stress substantially throughout a cross-sectional region of the optical fiber, wherein the cross-sectional region extends crosswise to a lengthwise axis of the optical fiber, and the cross-sectional region includes an annular portion of an outermost surface of the optical fiber;
causing tension in at least a portion of the optical fiber; and
propagating at least one crack across the optical fiber at a position between the lengths, and the at least one crack being positioned in sufficiently close proximity to the cross-sectional region, so that the compressive radial stress that is present substantially throughout the cross-sectional region restricts the at least one crack from penetrating the cross-sectional region, and the propagating occurs while both:
the compressive radial stress is present substantially throughout the cross-sectional region; and
the tension is present in the at least the portion of the optical fiber.

14. The method of claim 13, wherein:
the causing of the tension is comprised of causing lengthwise tension in the at least the portion of the optical fiber; and
the propagating occurs while the lengthwise tension is present in the at least the portion of the optical fiber.

15. The method of claim 13, wherein:
the lengths of the optical fiber comprise a first length of the optical fiber and a second length of the optical fiber;
the cross-sectional region is positioned in the second length of the optical fiber; and
the propagating is comprised of:
applying a breaking force to the first length of the optical fiber at a position spaced from both the at least one crack and the second length of the optical fiber; and
the braking force extending crosswise to the first length of the optical fiber.

16. The method of claim 13, wherein the mounting comprises forming an interference fit between the optical fiber and the ferrule.

17. The method of claim 13, wherein the mounting comprises causing relative movement between the optical fiber and the ferrule, so that there is an engaging between the ferrule and the optical fiber, and the engaging comprises there being opposing face-to-face contact between at least:
a bore of the ferrule; and
an incline in the annular portion of the outermost surface of the optical fiber, wherein the incline is inclined relative to a lengthwise axis of the optical fiber.

18. The method of claim 13, wherein:
the mounting comprises forming at least one crack nucleation site in the optical fiber, so that the at least one crack nucleation site is proximate both the outer surface of the optical fiber and an opening to a bore of a ferrule; and
the method further comprises initiating the at least one crack at the at least one crack nucleation site.

19. A method for at least separating lengths of an optical fiber from one another, comprising:
causing relative movement between the optical fiber and a ferrule while the optical fiber through a bore of the ferrule, wherein:
the optical fiber includes a cross-sectional region;
the cross-sectional region includes an annular portion of an outermost surface of the optical fiber; and
the causing of the relative movement is carried out so that both:
the cross-sectional region is wedged at least partially into the bore and the cross-sectional region is placed in a state of compressive stress; and
at least a portion of the optical fiber is in tension; and
breaking the lengths of the optical fiber apart from one another while the cross-sectional region is wedged at least partially into the bore and in the state of compressive stress and while the at least the portion of the optical fiber is in tension, so that a terminal end of the optical fiber is formed at a predetermined position, and the predetermined position is both:
positioned proximate the opening of the bore; and
positioned outside of the bore.

20. The method of claim 19, wherein the breaking is carried out so that the terminal end as a whole is within about 10 um from the opening of the bore.

21. The method of claim 19, wherein:
the lengths of the optical fiber comprise a first length of the optical fiber and a second length of the optical fiber;
the cross-sectional region, which is in the state of compressive stress, is positioned in the second length of the optical fiber; and
the breaking is further comprised of:
applying a breaking force to the first length of the optical fiber at a position spaced from both the at least one crack and the second length of the optical fiber; and
the braking force extending crosswise to the first length of the optical fiber.

22. The method of claim 19, wherein:
the at least the portion of the optical fiber is in lengthwise tension in response to at least the cross-sectional region being wedged at least partially into the bore and the relative movement between the optical fiber and the ferrule; and
the breaking occurs while the lengthwise tension is present in the at least the portion of the optical fiber.

23. The method of claim 22, wherein:
the causing of the relative movement is comprised of pulling;
the method further comprises adhesively mounting the optical fiber in the bore while the at least the portion of the optical fiber is in the lengthwise tension; and
the at least the portion of the optical fiber being in the lengthwise tension is further responsive to the optical fiber being adhesively mounting the in the bore.

* * * * *